United States Patent
Do et al.

(10) Patent No.: US 9,167,542 B2
(45) Date of Patent: Oct. 20, 2015

(54) DETERMINING CLOCK MODELS

(75) Inventors: Ju-Yong Do, Santa Clara, CA (US); Gengsheng Zhang, Santa Clara, CA (US); Dominic Gerard Farmer, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 13/418,068

(22) Filed: Mar. 12, 2012

(65) Prior Publication Data

US 2013/0235864 A1    Sep. 12, 2013

(51) Int. Cl.
*H04W 56/00* (2009.01)
*G01S 5/02* (2010.01)

(52) U.S. Cl.
CPC ............. *H04W 56/001* (2013.01); *G01S 5/021* (2013.01); *G01S 5/0226* (2013.01)

(58) Field of Classification Search
CPC ... G01S 5/0263; G01S 5/0063; G01S 5/0045; G01S 5/009; G01S 19/46; G01S 19/05; G01S 19/48; G01S 19/09; G01S 19/11; G01S 19/23; G01S 19/256; G01S 19/51; G01S 5/0257
See application file for complete search history.

(56) References Cited

U.S. PATENT DOCUMENTS

| | | | |
|---|---|---|---|
| 6,433,734 B1 | 8/2002 | Krasner | |
| 6,721,567 B1 | 4/2004 | Wang et al. | |
| 6,750,813 B2 | 6/2004 | Vargas-Hurlston et al. | |
| 6,823,257 B2 | 11/2004 | Clapper | |
| 7,084,809 B2 | 8/2006 | Hockley, Jr. et al. | |
| 7,139,225 B2 | 11/2006 | Farmer | |
| 7,305,238 B2 | 12/2007 | Gabara | |
| 7,925,274 B2 | 4/2011 | Anderson et al. | |
| 8,477,742 B2 * | 7/2013 | Grilli et al. | 370/336 |
| 2005/0037775 A1 * | 2/2005 | Moeglein et al. | 455/456.1 |
| 2005/0037786 A1 | 2/2005 | Edge | |
| 2008/0274753 A1 | 11/2008 | Attar et al. | |
| 2008/0287141 A1 | 11/2008 | Vogel et al. | |
| 2008/0316091 A1 | 12/2008 | Wigren et al. | |
| 2009/0058720 A1 | 3/2009 | Shaw et al. | |
| 2009/0273518 A1 | 11/2009 | Duffet-Smith et al. | |
| 2010/0178934 A1 * | 7/2010 | Moeglein et al. | 455/456.1 |
| 2010/0234043 A1 | 9/2010 | Wigren et al. | |

(Continued)

FOREIGN PATENT DOCUMENTS

| | | | |
|---|---|---|---|
| EP | 1209930 A2 | 5/2002 | |
| EP | 2073486 A1 | 6/2009 | |

(Continued)

OTHER PUBLICATIONS

International Search Report and Written Opinion—PCT/US2013/026893—ISA/EPO—Jul. 3, 2013.

(Continued)

*Primary Examiner* — Khaled Kassim
*Assistant Examiner* — Zhaohui Yang
(74) *Attorney, Agent, or Firm* — Berkeley Law & Technology Group, LLP

(57) ABSTRACT

Examples disclosed herein relate to methods and apparatuses for observing signals transmitted by one or more transmitters in an asynchronous communication network and applying a time reference to generate a clock model. In one embodiment, parameters representing the clock model may then be forwarded to other mobile devices to assist in positioning operations.

13 Claims, 7 Drawing Sheets

(56) References Cited

U.S. PATENT DOCUMENTS

| | | | |
|---|---|---|---|
| 2011/0059756 A1 | 3/2011 | Moeglein et al. | |
| 2011/0164607 A1* | 7/2011 | Farmer | 370/350 |
| 2011/0246148 A1 | 10/2011 | Gupta et al. | |
| 2012/0052874 A1 | 3/2012 | Kumar | |
| 2013/0035111 A1 | 2/2013 | Moeglein et al. | |

FOREIGN PATENT DOCUMENTS

| | | |
|---|---|---|
| JP | 2002236632 A | 8/2002 |
| JP | 2004013585 A | 1/2004 |
| JP | 2009124671 A | 6/2009 |
| JP | 2011504578 A | 2/2011 |
| JP | 2011509028 A | 3/2011 |
| WO | 2009098432 A1 | 8/2009 |
| WO | 2011163059 A1 | 12/2011 |

OTHER PUBLICATIONS

Polaris Wireless: "Content for TR 36.809 (Study on the inclusion of RF Pattern Matching Technologies as a location method in the E-UTRAN)", 3GPP Draft; R4E-110006, 3rd Generation Partnership Project (3GPP), Mobile Competence Centre ; 650, Route Deslucioles ; F-06921 Sophia-Antipolis Cedex; France, vol. RAN WG4, no. Electronic meeting; 20110826, Jun. 9, 2011, 19 Pages, XP050544581, [retrieved on Jun. 9, 2011] p. 7-p. 10.

Venkatachalam, et al., "Location Services in WiMAX Networks," WiMax Update, IEEE Communications Magazine, pp. 92-98, Oct. 2009.

* cited by examiner

DETERMINING CLOCK MODELS

BACKGROUND

1. Field

The subject matter disclosed herein relates to determining and applying fine time parameter(s) of a clock model.

2. Information

Wireless position determination systems may be used to determine the location of a device. The device may be a mobile or portable device that operates on battery power. A mobile handset may obtain a position fix by processing signals received from terrestrial transmitters fixed at known locations using any one of several techniques such as, for example, advanced forward trilateration ("AFLT") and/or observed time difference of arrival ("OTDOA"). In these particular techniques, a range from a mobile device receiver may be measured to three or more of such terrestrial transmitters fixed at known locations based, at least in part, on pilot signals transmitted by the transmitters fixed at known locations and acquired at the mobile device receiver. A mobile device may compare an observed phase of a pilot signal received from a known transmitter with a time reference to measure a range to the transmitter using known techniques. Unfortunately, a pilot signal transmitted from a base station is typically not precisely synchronized with such a time reference. This may happen, for example, if the pilot signal is transmitted from an "asynchronous" wireless communication network. This may lead to inaccurate measurements of ranges to terrestrial base stations based upon observed phases of such pilot signals.

SUMMARY

In one implementation, a method comprises: receiving from each of one or more mobile devices fine time measurements determined based, at least in part, on a first time reference in one or more first signals received at the mobile device from an asynchronous network and a second time reference; computing a clock model descriptive of timing of at least one signal transmitted from a transmitter in the asynchronous network based, at least in part, on the fine time measurements; and transmitting parameters representative of the computed clock model to other mobile devices.

In another implementation, an apparatus comprises: a receiver to receive messages from a communication network; a transmitter to transmit messages to said communication network; and a processor to: compute a clock model descriptive of timing of at least one signal transmitted in an asynchronous network based, at least in part, on fine time measurements received in messages from each of one or more mobile devices, said fine time measurements being determined based, at least in part, on a first time reference in on or more first signals received at the mobile device from the asynchronous network and a second time reference; and initiating transmission of messages containing parameters representative of the computed clock model through the transmitter to other mobile devices.

In another implementation, an article comprises: a storage medium comprising machine-readable instructions stored thereon which are executable by a special purpose computing apparatus to: compute a clock model descriptive of timing of at least one signal transmitted in an asynchronous network based, at least in part, on fine time measurements received in messages from each of one or more mobile devices, said fine time measurements being determined based, at least in part, on a first time reference in one or more first signals received at the mobile device from the asynchronous network and a second time reference; and initiating transmission of messages containing parameters representative of the computed clock model to other mobile devices.

In another implementation, an article comprises: a storage medium comprising machine-readable instructions stored thereon which are executable by a special purpose computing apparatus to: compute a clock model descriptive of timing of at least one signal transmitted in an asynchronous network based, at least in part, on fine time assistance measurements received in messages from each of one or more mobile devices, said fine time measurements being determined based, at least in part, on a first time reference in one or more first signals received at the mobile device from the asynchronous network and a second time reference; and initiating transmission of messages containing parameters representative of the computed clock model to other mobile devices.

In another implementation, an apparatus comprises: means for receiving from each of one or more mobile devices fine time measurements determined based, at least in part, on a first time reference in one or more first signals received at the mobile device from an asynchronous network and a second time reference; means for computing a clock model descriptive of timing of at least one signal transmitted from a transmitter in the asynchronous network based, at least in part, on the fine time measurements; and means for transmitting parameters representative of the computed clock model to other mobile devices.

In another implementation, a method comprises, at a mobile device: observing signals transmitted by one or more transmitters in an asynchronous communication network; updating a clock model based on at least one time reference in at least one of the observed signals; and applying the updated clock model to an acquired signal transmitted from at least one of the transmitters to obtain a position fix at the mobile device based, at least in part, on the updated clock model.

In another implementation, an article comprises: a non-transitory storage medium comprising machine-readable instructions stored thereon which are executable by a special purpose computing apparatus to: observe signals transmitted by one or more transmitters in an asynchronous communication network; update a clock model based on at least one time reference in at least one of the observed signals; and apply the updated clock model to an acquired signal transmitted from at least one of the transmitters to obtain a position fix at a mobile device based, at least in part, on the updated clock model.

In another implementation, an apparatus comprises: a receiver to acquire signals transmitted in an asynchronous communication network; and a processor to: observe signals acquired at said receiver and transmitted by one or more transmitters in an asynchronous communication network; update a clock model based on at least one time reference in at least one of the observed signals; and apply the updated clock model to an acquired signal transmitted from at least one of the transmitters to obtain a position fix at a mobile device based, at least in part, on the updated clock model.

An apparatus comprising: means for observing signals transmitted by one or more transmitters in an asynchronous communication network; means for updating a clock model based on at least one time reference in at least one of the observed signals; and means for applying the updated clock model to an acquired signal transmitted from at least one of the transmitters to obtain a position fix at the mobile device based, at least in part, on the updated clock model.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
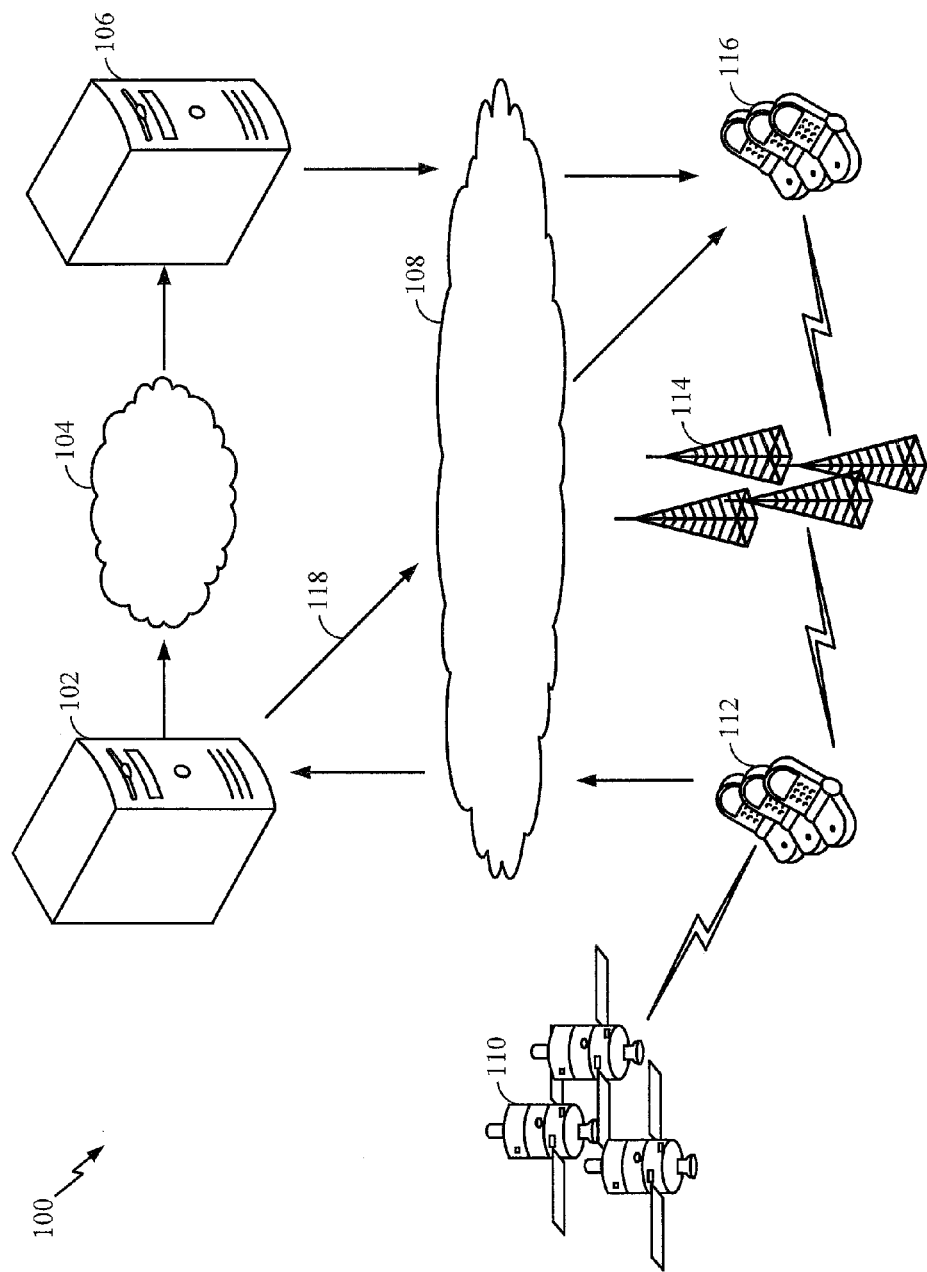
FIG. 1 is a schematic diagram of a communication network according to an implementation.

The Global Positioning System ("GPS") and other like satellite positioning systems (SPSs) have enabled navigation services for mobile handsets in outdoor environments. Global navigation satellite systems ("GNSS"), such as the GPS, Galileo, GLONASS and the like, may enable a terrestrial navigation receiver to process one or more SPS signals transmitted from transmitters fixed to space vehicles ("SVs") to obtain pseudorange measurements from the navigation receiver to the transmitters. With pseudorange measurements to a sufficient number of transmitters and knowledge of locations of the transmitters, the navigation receiver may estimate its location. An SPS signal may be encoded with a repeating sequential code. In one implementation, a receiver may attempt to determine a pseudorange measurement from an acquired SPS signal based, at least in part, on a detected code phase associated with the acquired SPS signal using well known techniques.

While a location estimate of a mobile device or "position fix" obtained from processing SPS signals is typically very accurate, use of SPS signals to obtain such a location estimate is not always available. In urban environments or canyons, for example, SPS signals may undergo multipath and/or attenuation making it difficult to process these signals to obtain pseudorange measurements. Also, obtaining a position fix by processing received SPS signals typically consumes substantially more battery energy/battery life than obtaining a position fix using OTDOA and/or AFLT. Also, some mobile handsets have receivers with capabilities limited to merely processing signals transmitted from terrestrial communication networks (e.g., cellular communication networks).

Alternatively, a mobile handset may obtain a position fix by processing pilot signals received from terrestrial transmitters fixed at known locations using any one of several techniques such as, for example, AFLT and/or OTDOA mentioned above. In these particular techniques, a range from a mobile device receiver may be measured to three or more of such terrestrial transmitters fixed at known locations based, at least in part, on phase detections in acquired pilot signals. A mobile device may compare an observed phase of a pilot signal received from a known transmitter with a time reference to measure a range to the transmitter using known techniques. However, a pilot signal transmitted from a base station may not precisely be synchronized with such a time reference. This may happen, for example, if the pilot signal is transmitted from an "asynchronous" wireless communication network. In this context, a transmitter in a "synchronous network" as indicated herein is directed to a device that transmits a signal modulated by a time reference that is synchronized with a known clock. For example, GPS, or other GNSS, may transmit a signal that is modulated with a data signal comprising a time reference that is synchronized with a GPS clock. Also, certain cellular communication systems such as CDMA, for example, are synchronized with a known clock. In contrast, a receiver may acquire a signal transmitted from an "asynchronous network" having a timing reference that is not synchronized to a clock that is known by the receiver. Certain cellular communication systems including, for example, GSM and WCDMA, may appear to a mobile receiver as asynchronous. Here, detection of a timing reference in a signal from a transmitter in an asynchronous network may be of limited use in attempting to measure a range to the transmitter based on a measured signal travel time without knowledge of a relationship between timing of the signal in the asynchronous network.

In one particular implementation, mobile devices operated by subscribers in an asynchronous communication network may assist in development of a clock model for modeling timing (e.g., a reference time) of signals transmitted from particular transmitters (e.g., base station transmitters) in the asynchronous network. Parameters representing a developed or updated clock model may then be transmitted to subscriber devices in the asynchronous network and/or other devices. By having an accurate clock model for modeling timing of signals transmitted from particular transmitters in an asynchronous network, a mobile device may be better capable of obtaining accurate pseudorange measurements to the particular transmitters by compensating for relative time offsets of signals transmitted by the particular transmitters to a reference time frame.

FIG. 1 is a schematic block diagram of a communications network 100 comprising first mobile devices 112 and second mobile devices 116. Communications network 100 may comprise a cellular communications network capable of enabling voice or data communication for a number of mobile devices including first mobile devices 112 and second mobile devices 116.

FIG. 1 illustrates a particular implementation in which mobile devices (e.g., first mobile devices 112 and second mobile devices 116) in an asynchronous network may act as either gatherers of timing events and/or consumers of a clock model derived from crowdsourced timing events. First mobile devices 112 may acquire signals from a synchronous network such as a satellite positioning system (e.g., GPS) and signals from one or more base station transmitters of an asynchronous network. First mobile devices 112 may then compare an observed timing event in a signal acquired from a transmitter in the synchronous network with a timing reference in a signal acquired from a transmitter in an asynchronous network to derive fine time assistance parameters. Fine time measurements obtained at one or more mobile devices (first mobile device 112, second mobile device 116, etc.) in the asynchronous network may then be transmitted to a server for computing a "crowdsourced" clock model descriptive of a time reference in signals transmitted by transmitters in the asynchronous communication network.

Communication network 100 may include a first server 102, a second server 106, a network 104, a wireless network 108, SVs 110, and base stations 114. Communications network 100 may include numerous base stations 114 that enable mobile device's such as mobile devices 112 and 116 to access wireless network 108. Base stations 114 may be grouped or categorized based on geographic data, historical data, predictive patterns, traffic flow, or any combination thereof. The particular configuration of base stations depicted in FIG. 1 is merely an example configuration and claimed subject matter is not limited in this respect.

SVs 110 may be associated with one or more GNSS' such as, GPS, GLONASS, and Galileo, although the scope of claimed subject matter is not limited in this respect. First mobile devices 112 and/or second mobile devices 116 may acquire signals transmitted from satellites 110 to, among other things obtain a position fix.

In another aspect, position determination calculations may be performed by a network entity such as, for example, a first server 102 and/or second server 106, rather than at a first mobile device 112 and/or second mobile device 116. Such a calculation may be based, at least in part, on signals acquired by first mobile device 112 and/or second mobile device 116 from one or more of base stations 114. In a further aspect, first server 102 and/or second server 106 may transmit the calculated position to first mobile device 112 and/or second mobile device 116.

First server 102 may be connected to (communicate with) second server 106 via network 104 and connected (communicate with) first mobile device 112 and/or second mobile device 116 via wireless network 108. In particular implementations, network 104 and wireless network 108 may facilitate communication with Internet Protocol packets. However, other communication formats may be used. First server 102 may utilize a first communication link 118 to transmit assistance messages to first mobile devices 112 via wireless network 108. Second server 106 may utilize a second communication link 120 to transmit assistance messages to second mobile devices 116 via wireless network 108. A first mobile device 112 may utilize a third communication link 112 to transmit messages containing fine time measurements to first server 102 and/or second server 106 via wireless network 108.

In one embodiment, fine time measurement(s) may be determined based on, for example, observed event signals received from an asynchronous network (such as observed signal frame boundaries) and time stamps in signals received from a synchronous network (e.g., synchronous cellular communication network or SPS) from one or more mobile devices 112. In a particular implementation, fine time measurements may comprise an indication of an observed offset or time difference between a first time reference in a signal transmitted in a base station of an asynchronous network and a second time reference reliably synchronized with a known clock (e.g., time reference in an SPS signal).

In a particular implementation, server 102 or 104 may combine or crowdsource fine time measurements obtained at and received from multiple mobile devices 112 in determining a clock model for a particular base station transmitter in an asynchronous network. Here, observations of signals transmitted from a base station in an asynchronous network from multiple mobile devices 112 may enable computation of clock model with greater accuracy than a clock model computed based observations from a single mobile device 112. Additionally, as discussed herein, accuracy of fine time measurements determined from observations at a mobile device 112 may be affected by accuracy of an estimated location of the mobile device 112 and accuracy of an estimated time. Accordingly, fine time measurements received from multiple mobile devices 112 may be appropriately weighted according to how accurately location and time are known while signals from an asynchronous network are being observed.

In one implementation, to account for signal propagation time in obtaining or referencing fine time measurements, an accurate comparison of an observed timing reference in a signal acquired from a synchronous network with a timing reference observed in a signal acquired from an asynchronous network may consider a location of an observing mobile device. As such, accuracy of fine time measurements obtained at a mobile device may depend, at least in part, on an uncertainty of a location of the mobile device and an uncertainty in time (e.g., as synchronized with a GPS clock). Accordingly, fine time measurements obtained from mobile devices 112 with a high time or position uncertainty may be given a low weight, or ignored altogether in computing a clock model.

In a particular implementation, a clock model derived from crowdsourced fine time measurements may be capable of predicting behavior of the timing of asynchronous network signals in the future. This may allow for less frequent requests for positioning assistance data (e.g., for use of AFLT in an asynchronous network). A mobile device may be able to enhance and update a provided clock model based on its own observation of network signals or events, and may extend usage further to reduce requests for positioning assistance data.

Figure 2:
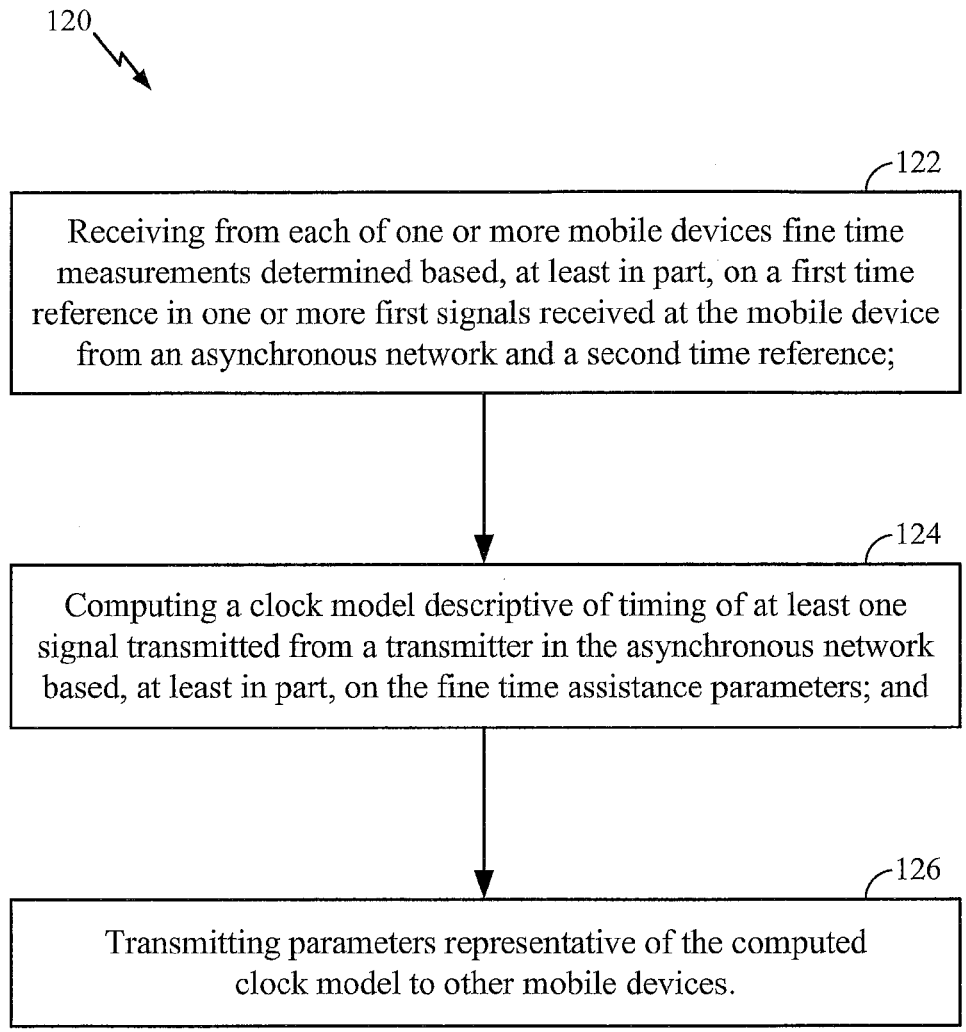
FIG. 2 is a flow diagram of a process to determine parameters of a computed clock model according to an implementation.

As pointed out above, acquisition of signals transmitted by a transmitter in an asynchronous network at a mobile device may be of little utility in measuring a range to the transmitter based on a measured transmission time. FIG. 2 is directed to a process 120 of determining a clock model descriptive of timing of one or more signals transmitted by an asynchronous network. This computed clock model may then be distributed among mobile devices for use in positioning operations such as, for example, measuring a range to a transmitter in an asynchronous network.

At block 122, a server (such as first server 102) may receive from individual mobile devices (such as mobile devices 112) messages containing fine time measurements to enable one or more servers (e.g., servers 102, 106) to compute assistance parameters to be forwarded to a mobile device (e.g., mobile devices 116). As described below in specific implementations, a mobile device (e.g., a mobile device 112) may obtain fine time measurements from observing signals transmitted from both synchronous networks (e.g., GPS or CDMA) and signals transmitted from asynchronous networks (e.g., GSM, WCDMA or LTE). Here, a mobile device may determine a fine time measurement based, at least in part, on a first time reference in one or more signals received from a transmitter in an asynchronous network and a second time reference. In one implementation, the second time reference may be reliably synchronized with a known clock such as, for example, a GPS clock (or clock for another like SPS) or a clock for a synchronous cellular communication network, just to name a couple of examples. In a particular implementation, a particular network may appear to a mobile device as being synchronous or asynchronous depending on whether the mobile device has knowledge of a clock that is advancing timing of the particular network. In one embodiment, a mobile device may be pre-programmed to distinguish between an asynchronous network and a synchronous network based on a particular receiver or transceiver used for observing a signal in question (e.g., synchronous if the observed signal is being processed/acquired at a GPS or CDMA interface and asynchronous if the observed signal is being processed/acquired on a GSM or WCDMA interface). Also, in particular implementations, the mobile device may internally maintain the second time reference using an internal clock that is updated from time to time from acquisition of signals with a time reference (e.g., transmitted by a synchronous network).

Particular examples described below identify GPS or an SPS has comprising a synchronous network. It should be understood, however, that these are merely examples of a synchronous network and claimed subject matter is not limited in this respect. In one particular implementation, a mobile device may determine fine time measurements including frame boundaries detected in a signal acquired from an asynchronous network and time references detected in an acquired GPS signal. A base station transmitter in an asynchronous network may continuously generate message frames and transmit signals based on an internal clock. In the absence of GPS time stamps on these frames, their temporal relationship to the GPS time may be ambiguous and arbitrary. Furthermore, there may exist an inherent ambiguity from frame to frame since a frame number may reset to zero after reaching a maximum value. This may be referred to as "frame rollover" event happening every 3.48 hours in GSM and 40.96 seconds in WCDMA, for example.

Figure 3:
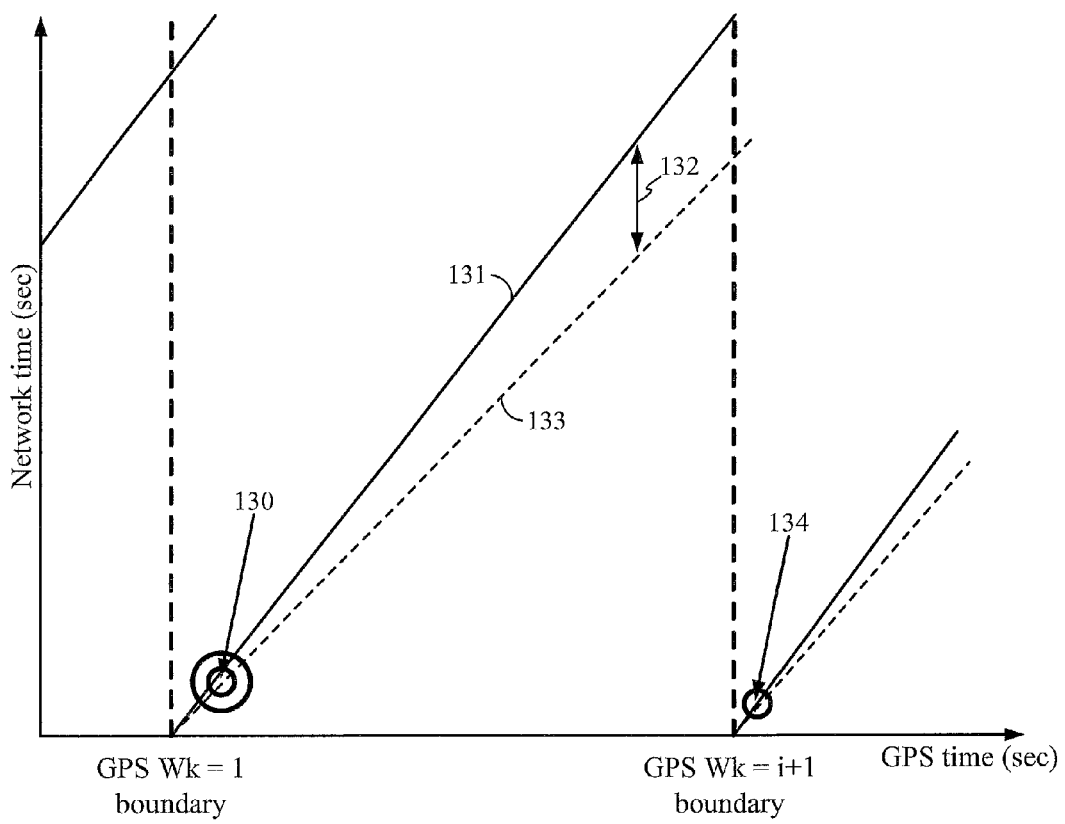
FIG. 3 is a plot illustrating a relationship between asynchronous network time and GPS time according to an implementation.

According to an embodiment, and as discussed below, a continuous time model may be constructed from observed network frames despite frame ambiguity and frame rollover. FIG. 3 illustrates a particular example of using a time reference observed in a GPS signal to construct a continuous time model for an asynchronous network. However, this is merely an example of a signal having an observable time reference that is reliably synchronized to a known clock, and claimed subject matter is not limited in this respect. As illustrated in a particular example shown in FIG. 3, a time reference point may be established within a GPS week which is the head of a first frame of a first frame rollover period in the asynchronous network in the GPS week. Here, point 130 may mark a reference network time point for a week i and beginning of a fine time measurement observation while point 134 may mark a reference asynchronous network time for a week i+1. A number of frame rollover events for a given measurement (frame number, GPS time) may be obtained between points 130 and 134. A corresponding number of frames may be added to a reported frame number. An observed network frame number may be converted to seconds by multiplying the network frame number by seconds/frame (e.g., 4.615 ms/frame in GSM and 10.0 ms/frame in WCDMA). An artificial time offset may be removed by subtracting an initial offset value at the beginning of the observed week to align asynchronous network time and GPS time at the beginning of the observed week. Line 131 may represent an advance of time according to GPS time while line 133 may represent an advance of time according to an asynchronous network. A difference between asynchronous network time and GPS time may be observed at 132. A previous time offset may be added for continuity if there is an existing estimate of relative time offset from a previous week. This difference between network time and GPS time may then be included in fine time measurements to be transmitted to a server as discussed above.

In one particular non-limiting example implementation, a fine time measurement obtained at a mobile device may comprise a frame number observed in a signal received from a transmitter in an asynchronous network (fn) and a time that the frame number was observed (e.g., GPS time). Also, an estimated location, along with an uncertainty of the estimated location of the mobile device, may also accompany the fine time measurements. A message containing a fine time measurement may include the observed frame number, estimated location and uncertainty, and GPS time as a time stamp.

At block 124 of FIG. 2, a server may compute a clock model descriptive of timing of signals transmitted from one or more transmitters (e.g., base station transmitters) in an asynchronous network based, at least in part, on fine time measurements obtained in block 122 (e.g., difference between asynchronous network time and GPS time in the particular non-limiting example above). In a particular implementation, parameters to model timing of a base station transmitter may be computed in expressions (1) and (2) as follows:

$$b(t_i) = b(t_{n-1}) + \int_{t_{n-1}}^{t_i} \Delta f(t) dt \approx b(t_{n-1}) + (t_i - t_{n-1}) \Delta f(t_{n-1}); \quad (1)$$

$$m(t_i) = b(t_i) + e_b(t_i) \approx b(t_{n-1}) + (t_i - t_{n-1}) \Delta f(t_{n-1}) + e_b(t_i) \quad (2)$$

where:

$b(t)$ is a relative time offset between asynchronous network time and a time reference reliably synchronized with a known clock (e.g., GPS time reference) in sec;

$\Delta f(t)$ is a normalized frequency offset of a clock controlling the advance of time in an asynchronous network in ppb (part per billion);

$m(t)$ is a relative time offset measurement between asynchronous network time and the time reference reliably synchronized with the known clock in sec; and $e_b(t)$ is a measurement error on clock offset from the mobile and assumed to be zero mean independently and normally distributed.

Values for $m(t)$ may be determined from fine time assistance measurements received from one or more mobile devices. First, a frame number fn may be converted to continuous units of time (as described below). The difference between this continuous time and a time that the frame number was observed (e.g., GPS time stamp provided in the message containing the fine time measurement) may then provide a value for $m(t)$. A value of $b(t)$ may then be computed based on $m(t)$ by, for example, removal of any known measurement biases. A value for $\Delta f(t)$ represents a frequency offset of a clock controlling the advance of time in signals transmitted from the asynchronous network in question and may be estimated based on an observed drift in $m(t)$ and/or $b(t)$. By estimating a value for $\Delta f(t)$, a value for $b(t)$ may be predicted as shown above.

In a particular implementation, the advance of time in an asynchronous network may be controlled by an internal clock. For example, a time reference in a signal transmitted in an asynchronous network may be controlled by an internally maintained clock (e.g., internally maintained clock at a base station). As such, a drift in frequency of the internally maintained clock may impart a drift in the time reference in the signal transmitted in the asynchronous network. As may be observed from expressions (1) and (2), following an updated measurement of $b(t)$ and $\Delta f(t)$ obtained, for example, from fine time measurements received from mobile devices in block 122, expressions for computing $b(t)$ and $\Delta f(t)$ may be updated or predicted based, at least in part, on $m(t)$ which is calculated from fine time measurements from mobile devices.

In a particular implementation, mobile devices may provide fine time measurements to a server for computation of a clock model in messages that batch several fine time measurements over a time period of a difference between asynchronous network time and a time reference reliably synchronized with a known clock over a time period. As such, parameters of a clock model descriptive of timing of signals transmitted from one or more transmitters (e.g., base station transmitters) in an asynchronous network may be computed in data processing blocks covering measurements obtained in overlapping time periods. In one example implementation, messages containing fine time measurements uploaded from mobile devices may be collected on a regular interval (e.g., one hour). Measurements older than a certain time (e.g., block size) may be excluded from use in computing m(t), b(t) and Δf(t).

In particular implementations, as discussed above, a server may forward messages to mobile devices containing assistance data including, for example, parameters representing a clock model of timing events at an asynchronous network. Such parameters representing a clock model may include, for example, a fine time assistance frame number ($fn_{FTA}$), a time reference ($t_{FTA}$) for the frame number (e.g., time stamp in GPS time), frequency offset estimate (Δf(t)), time uncertainty estimate ($\sigma_t$) and frequency uncertainty ($\sigma_f$). A value for $fn_{FTA}$ may be computed from b(t) and Δf(t) by converting b(t) back to a frame number with consideration of a drift in time advance introduced by a frequency offset represented by Δf(t) for the time reference ($t_{FTA}$) accordingly. Time reference ($t_{FTA}$) may represent a time when fine time assistance message is generated or time in the past or future. Here, representing a clock model at least in part with b(t) and Δf(t), we can predict $fn_{FTA}$ for any $t_{FTA}$. For example, if we're trying to generate an assistance message at 12:00 PM Jan. 1, 2012, we can set $t_{FTA}$=at 12:00 PM Jan. 1, 2012. Then, we can calculate the a corresponding $fn_{FTA}$. Time reference $t_{FTA}$ may be set as any time in past, future, or current time. If time reference $t_{FTA}$ is set as current time, a clock model provided in an assistance message may be expected to be applied at current and future times. Thus, a mobile device can use a clock model provided in an assistance message immediately upon receipt and for some time in future. Usefulness of a clock model provided in an assistance message may be time-limited after $t_{FTA}$ and its predication error grows over time. Values for $\sigma_t$ and $\sigma_f$ may be computed as explained below in a non-limiting example.

In a particular implementation, values for computing y=[Δf, b] over a time period containing two or more measurements m (such as a data processing block as discussed above) values may be combined using a linear regression model according to expression (3) as follows:

$$m = Ty + e_b \quad (3)$$

where:

$$m = [m(t_0) m(t_1) \ldots m(t_{n-1})]^T;$$

$$e_b = [e_b(t_0) e_b(t_1) \ldots e_b(t_{n-1})]^T;$$

$$y = [\Delta f(t_{n-1}) b(t_{n-1})]^T; \text{ and}$$

$$T = \begin{bmatrix} t_0 - t_{n-1} & 1 \\ t_1 - t_{n-1} & 1 \\ \vdots & \vdots \\ t_{n-1} - t_{n-1} & 1 \end{bmatrix}.$$

A linear regression result may then be given in expression (4) as follows:

$$\hat{y} = T^\dagger m \quad (4)$$

According to an embodiment, an expression of uncertainty in an estimate of y as function of time b(t) and frequency offset Δf(t) may be computed using concepts of dilution of precision (DOP), including a time DOP (TDOP) and a frequency DOP (FDOP). Values for TDOP and FDOP may be derived from T in expression (5) as follows:

$$\text{FDOP} = [(T^T T)^{-1}]_{1,1}$$

$$\text{TDOP} = [(T^T T)^{-1}]_{2,2} \quad (5)$$

Uncertainty of time and frequency estimates for a given measurement uncertainty, $\hat{\sigma}_m$, may be shown in expression (6) as follows:

$$\hat{\sigma}_f = \text{FDOP} \times \hat{\sigma}_m$$

$$\hat{\sigma}_t = \text{TDOP} \times \hat{\sigma}_m, \quad (6)$$

where $\hat{\sigma}_m$ may be computed based on a discrepancy between measurements and an estimated linear model ($\Delta f(t_{n-1})$ and $b(t_{n-1})$) as follows:

$$\hat{\sigma}_m = \sqrt{\frac{1}{n} \sum_{i=0}^{n-1} \{m(t_i) - [\hat{b}(t_{n-1}) + (t_i - t_{n-1})\hat{\Delta f}(t_{n-1})]\}^2}.$$

In another embodiment, linear regression results of expression (3) in different time intervals (e.g., from different data processing blocks) may be further combined with application of a Kalman filter model. Here, a Kalman filter may consider an intermediate estimate from a robust fit (RF) linear regression model in expression (4), $\widehat{y_{RF}}(t) = [\widehat{\Delta f_{RF}}(t) \ \widehat{b_{RF}}(t)]^T$, and generate a combined estimate $\widehat{y_{RF}}(t)$. Here, such Kalman filter model may be at least partially characterized as follows:

Observation variables: $\widehat{y_{RF}}(t) = [\widehat{\Delta f_{RF}}(t) \ \widehat{b_{RF}}(t)]^T$;

State variables: $\widehat{y_{RF}}(t) = [\widehat{\Delta f_{RF}}(t) \ \widehat{b_{RF}}(t)]^T$;

Observation model:

$$H = \begin{bmatrix} 1 & 0 \\ 0 & 1 \end{bmatrix};$$

State transition model:

$$A = \begin{bmatrix} 1 & 0 \\ \Delta t & 1 \end{bmatrix};$$

Observation noise variance:

$$R = \begin{bmatrix} \max(\hat{\sigma}^2_{f,RF}, \sigma^2_{f,default}) & 0 \\ 0 & \max(\hat{\sigma}^2_{t,RF}, \sigma^2_{t,default}) \end{bmatrix};$$

and
State noise variance:

$$Q = \begin{bmatrix} \sigma^2_{f,state} & 0 \\ 0 & \sigma^2_{t,state} \end{bmatrix}.$$

At block 126, a server may transmit parameters representative of the clock model computed in block 124 to other mobile devices (e.g., mobile devices 116) for use in positioning operations as discussed above.

Figure 4:
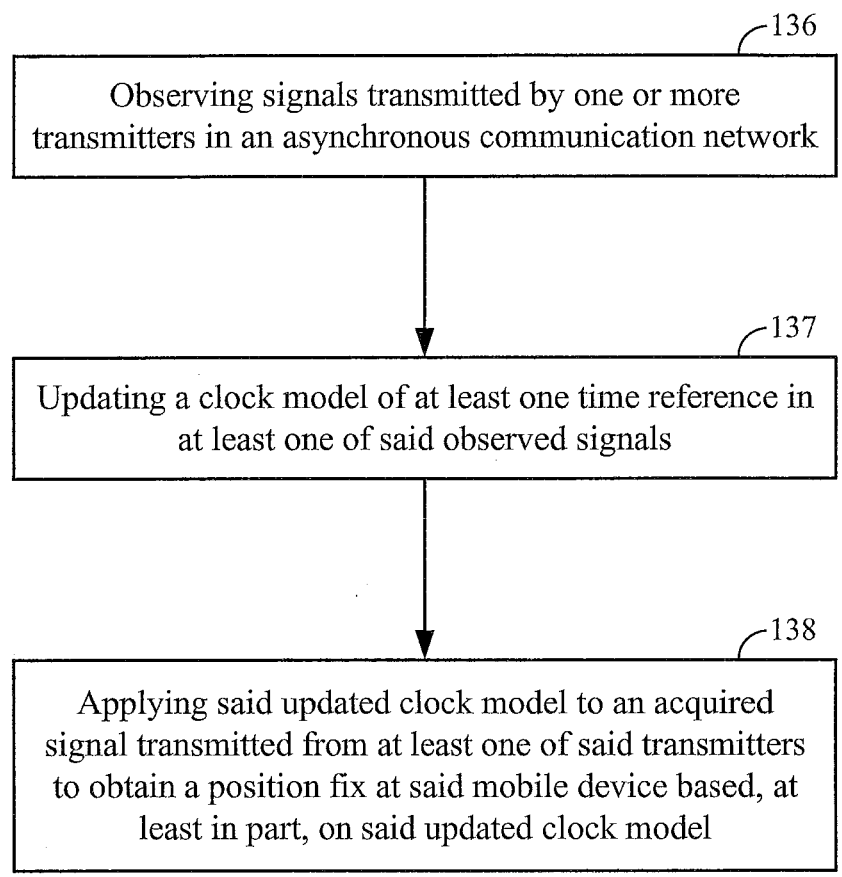
FIG. 4 is a flow diagram of a process to apply an updated clock model in obtaining a position fix according to an implementation.

FIG. 4 is a flow diagram of a process obtaining a position fix at a mobile device by processing signals observed from a transmitter in an asynchronous network using parameters representing a computed clock model (e.g., as computed according to process 120 as described above). As pointed out above, a base station transmitter in an asynchronous network may continuously transmit message frames timed according to an internal clock (e.g. at a base station transmitter). According to an embodiment, a continuous time model may be constructed from parameters of a computed clock model. Since there may be no time stamps relative to a clock known at a mobile device receiver (e.g., GPS time stamps) on frames transmitted in an asynchronous network, any relationship to such a clock known at the mobile device may be ambiguous and arbitrary. Furthermore, as pointed out above, there may be an inherent ambiguity from an observed number frame of a frame transmitted from the transmitter in the asynchronous network since a frame number resets to zero after reaching a maximum value in a frame rollover.

At block 136, a mobile device (e.g., a mobile device 116) may acquire a signal transmitted by a transmitter in an asynchronous network (e.g., base station transmitter in a cellular communication network). As pointed out above, the mobile device may detect a time reference in the acquired signal such as, for example, a frame boundary. In a particular implementation, a mobile device may internally maintain a clock model to advance time and the occurrence of timing events at the asynchronous network. At block 137, a mobile device may update an internal clock model representing timing of the time reference in the acquired signal based, at least in part, on received parameters representing the clock model (e.g., transmitted to the mobile device by a server at block 126). For example, the mobile device may attempt to update the internal clock model relative to a reliable timing reference controlled according to a known clock (e.g., GPS time). At block 138, the updated clock model may be applied to a time reference observed in a signal acquired from a transmitter in an asynchronous network for measuring a range to the transmitter as part of a positioning operation.

As pointed out above, an accurate comparison of an observed timing reference in a signal acquired from the synchronous network with a timing reference in a signal acquired from an asynchronous network to obtain fine time measurements at a mobile device may depend, at least in part, on a location of the mobile device. As such, accuracy of fine time measurements computed at a mobile device may be affected, at least in part, on a time uncertainty and/or position uncertainty of the mobile device.

In a particular example implementation, a mobile device may obtain approximation or estimate of its location, $u_{approx}$, and timing reference, $t_{approx}$, with uncertainty of less than a half of a frame rollover period (3.48 hours in GSM and 40.96 seconds in WCDMA). A distance between the mobile device and the transmitter (e.g., base station transmitter) located at $s_{cell}$, may be determined from an approximated signal as follows:

$$\Delta f_{delay} = \|u_{approx} - s_{cell}\|.$$

If a value of $u_{approx}$ is not available, a value for $\Delta \hat{t}_{delay}$ may be set to a half of cell radius (e.g., of a base station in an asynchronous network). A number of frame rollover instances, $\hat{N}_{rollover}$, from a fine time assistance reference time, $t_{FTA}$, may be computed as follows:

$$\hat{N}_{rollover} = \left\lfloor \frac{t_{approx} - (t_{FTA} - fn_{FTA} \times T_{frame})}{T_{rollover}} \right\rfloor$$

where:
$fn_{FTA}$=frame number provided in a fine time assistance message at $t_{ref}$;
$t_{FTA}$=reference time of a fine time assistance message;
$T_{frame}$=time length of a frame; and
$T_{rollover}$=time length of a frame rollover period.

Figure 5:
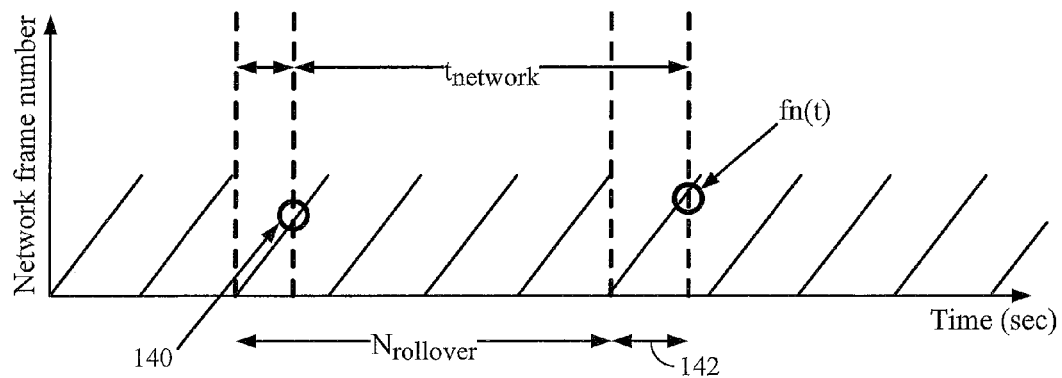
FIG. 5 is a plot illustrating a relationship between network frames and time according to an implementation.

As shown in FIG. 5 in a particular example, a fine time assistance frame number $fn_{FTA}$ at time 140 following a rollover event may be propagated over future rollover events. A network frame number fn(t) observed in a signal from an asynchronous network, at a time 142 after frame rollover, may be converted to a continuous network time, $\hat{t}_{Network}(t)$ relative to $t_{FTA}$ as follows:

$$\hat{t}_{Network}(t) = (fn(t) - fn_{FTA}) \times T_{frame} + \hat{N}_{rollover} \times T_{rollover}.$$

A corresponding GPS time, $\hat{t}_{GPS}(t)$, based on the FTA frequency offset at reference time, $\widehat{\Delta f}_{FTA}$, considering time elapse from $t_{FTA}$ and time delay due to distance from the base station transmitter, may be computed as follows:

$$\hat{t}_{GPS}(t) = t_{FTA} + \hat{t}_{Network}(t) \times (1 - \widehat{\Delta f}_{FTA}) + \Delta \hat{t}_{delay}.$$

A corresponding uncertainty in $\hat{t}_{GPS}(t)$, which may grow as the FTA reference time after generation of a fine time assistance message ages over time, may be computed as follows:

$$\hat{\sigma}_t(t) = \sqrt{\hat{\sigma}_{t,mobile}^2 + \hat{\sigma}_{t,FTA}^2 + (\hat{t}_{GPS}(t) - t_{FTA})^2 \times \hat{\sigma}_{f,FTA}^2} \approx$$

$$\hat{\sigma}_{t,mobile} + (\hat{t}_{GPS}(t) - t_{FTA}) \times \hat{\sigma}_{f,FTA}.$$

where:
$\hat{\sigma}_t(t)$=estimated timing uncertainty in time, t, due to propagation in future,
$\hat{\sigma}_{t,mobile}$=estimated timing uncertainty in time, t, due to mobile's positioning uncertainty (generally, $\hat{\sigma}_{t,mobile} \gg \hat{\sigma}_{t,FTA}$),
$\hat{\sigma}_{t,FTA}$=given timing uncertainty from a FTA message at reference time, $t_{FTA}$;
$\hat{\sigma}_{t,FTA}$=given frequency uncertainty from a FTA message at reference time, $t_{FTA}$.

Figure 6:
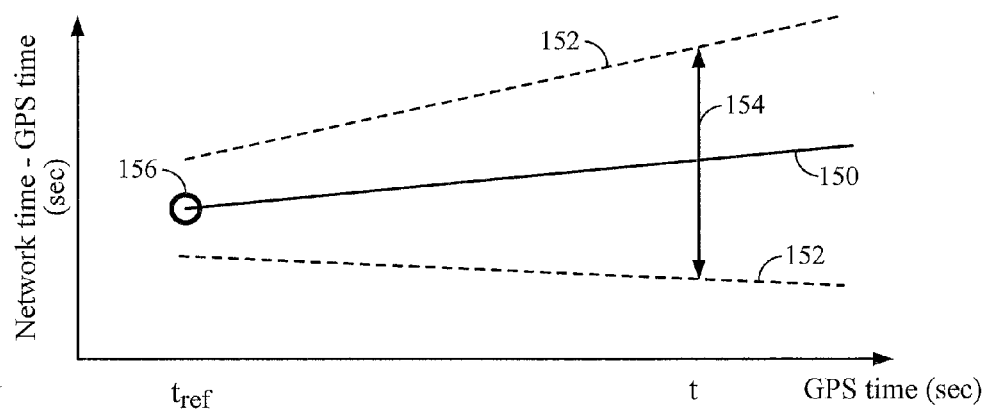
FIG. 6 illustrates a growing uncertainty in an estimated time according to an implementation.

FIG. 6. illustrates how an uncertainty 154 in an estimate of GPS time grows over time from a time reference 156. Line 150 may illustrated an estimated advance of time with respect to known GPS time while lines 152 illustrate how an uncertainty in an estimated advance of time increases over time.

Figure 7:
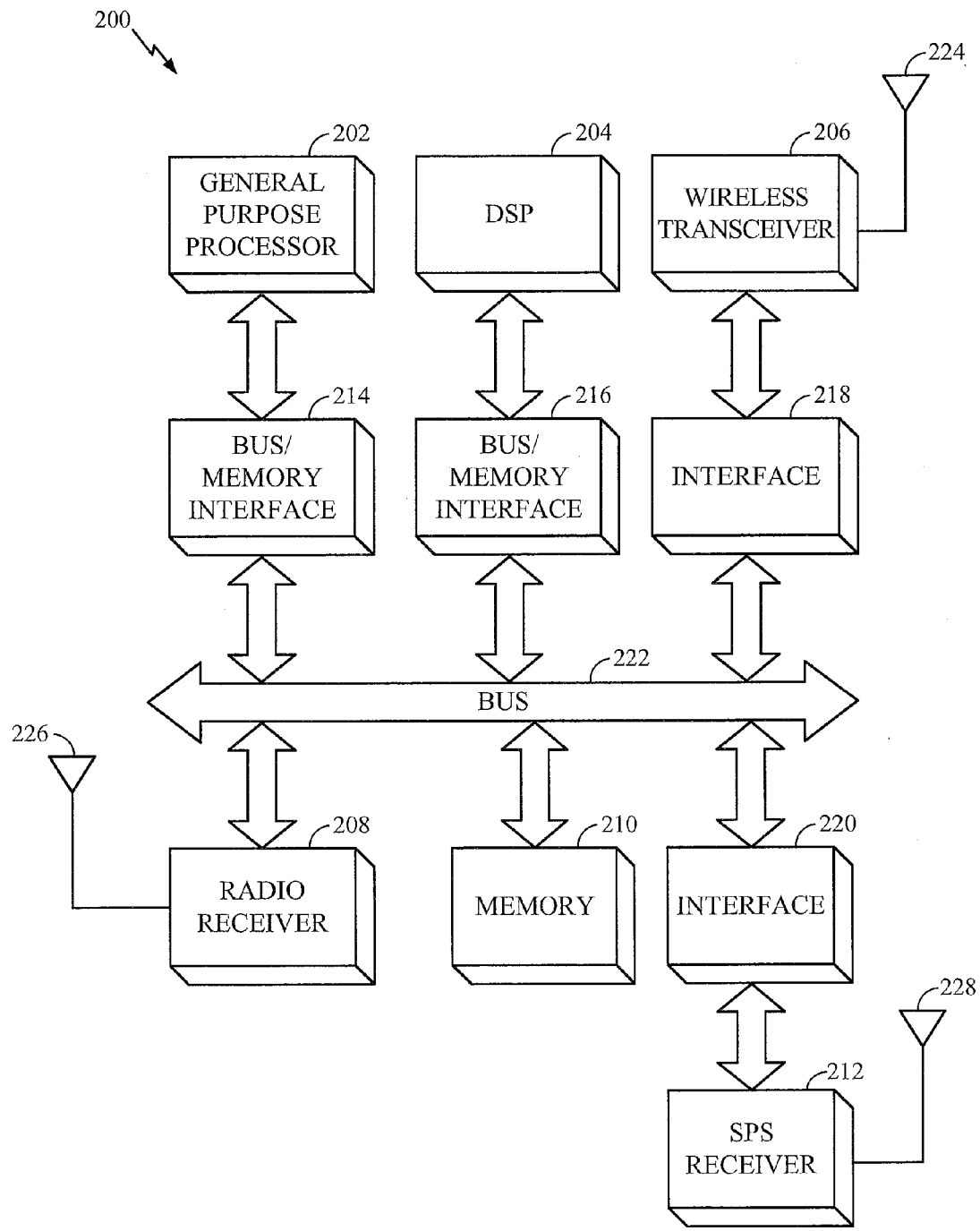
FIG. 7 is a schematic diagram of a mobile device according to an implementation.

FIG. 7 is a schematic diagram of a mobile device 200 (e.g., used as a mobile device 112 or 116 discussed above in FIG. 1). Mobile device 200 may comprise any type of wireless communication device, such as a wireless telephone, including cordless telephones, cellular telephones, Personal Communication System ("PCS") telephones, or another type of wireless telephone. Mobile device 200 may also comprise a two-way radio, such as a walkie-talkie, or other type of communications transceiver. Mobile device 200 may also include circuits to receive and/or transmit Bluetooth, 802.11, or other types of wireless signals.

As illustrated, the mobile device architecture 200 may include, for example, a general purpose processor 202, a digital signal processor 204, a wireless transceiver 206, a radio receiver 208, a memory 210, and an SPS receiver 212. A bus 222 or other alternative structure or structures may be provided for establishing interconnections between various components of the architecture 200. In the illustrated implementation, one or more interfaces 214, 216, 218, 220 may be provided between selected components and bus 222. The wireless transceiver 206, the radio receiver 208, and the SPS receiver 212 may each be coupled to one or more antennas 224, 226, 228, and/or other transducers, to facilitate the transmission and/or reception of wireless signals.

The general purpose processor 202 and the digital signal processor 204 are digital processing devices that are capable of executing programs to provide one or more functions and/or services to a user. One or both of these processors 202, 204 may be used, for example, to execute an operating system of a corresponding wireless device. One or both of these processors 202, 204 may also be used, for example, to execute user application programs including, for example, location-based applications that may rely on the availability of an accurate position estimate. In addition, one or both of these processors 202, 204 may be used to implement, either partially or fully, one or more of the positioning related processes or techniques described herein in some implementations. It should be appreciated that other forms of digital processing devices may additionally or alternatively be used to perform some or all of the described functions in various implementations including, for example, one or more controllers, microcontrollers, application specific integrated circuits (ASICs), field programmable gate arrays (FPGAs), programmable logic arrays (PLAs), programmable logic devices (PLDs), reduced instruction set computers (RISCs), and/or others, including combinations of the above.

Wireless transceiver 206 may include any type of transceiver that is capable of supporting wireless communication with one or more remote wireless entities. In various implementations, wireless transceiver 206 may be configured in accordance with one or more wireless networking standards and/or wireless cellular standards. In some implementations, multiple wireless transceivers may be provided to support operation with different networks or systems in a surrounding environment. During mobile device operation, wireless transceiver 206 may be called upon to communicate with a base station or access point of a wireless communication system or network. Radio receiver 208 may be operative for receiving signals from one or more sensors of a sensor network or other transmitting nodes within a surrounding environment.

Memory 210 may include any type of device or component, or combination of devices and/or components, that is capable of storing digital information (e.g., digital data, computer executable instructions and/or programs, etc.) for access by a processing device or other component. This may include, for example, semiconductor memories, magnetic data storage devices, disc based storage devices, optical storage devices, read only memories (ROMs), random access memories (RAMs), non-volatile memories, flash memories, USB drives, compact disc read only memories (CD-ROMs), DVDs, Blu-Ray disks, magneto-optical disks, erasable programmable ROMs (EPROMs), electrically erasable programmable ROMs (EEPROMs), magnetic or optical cards, and/or other digital storage suitable for storing electronic instructions and/or data.

Figure 8:
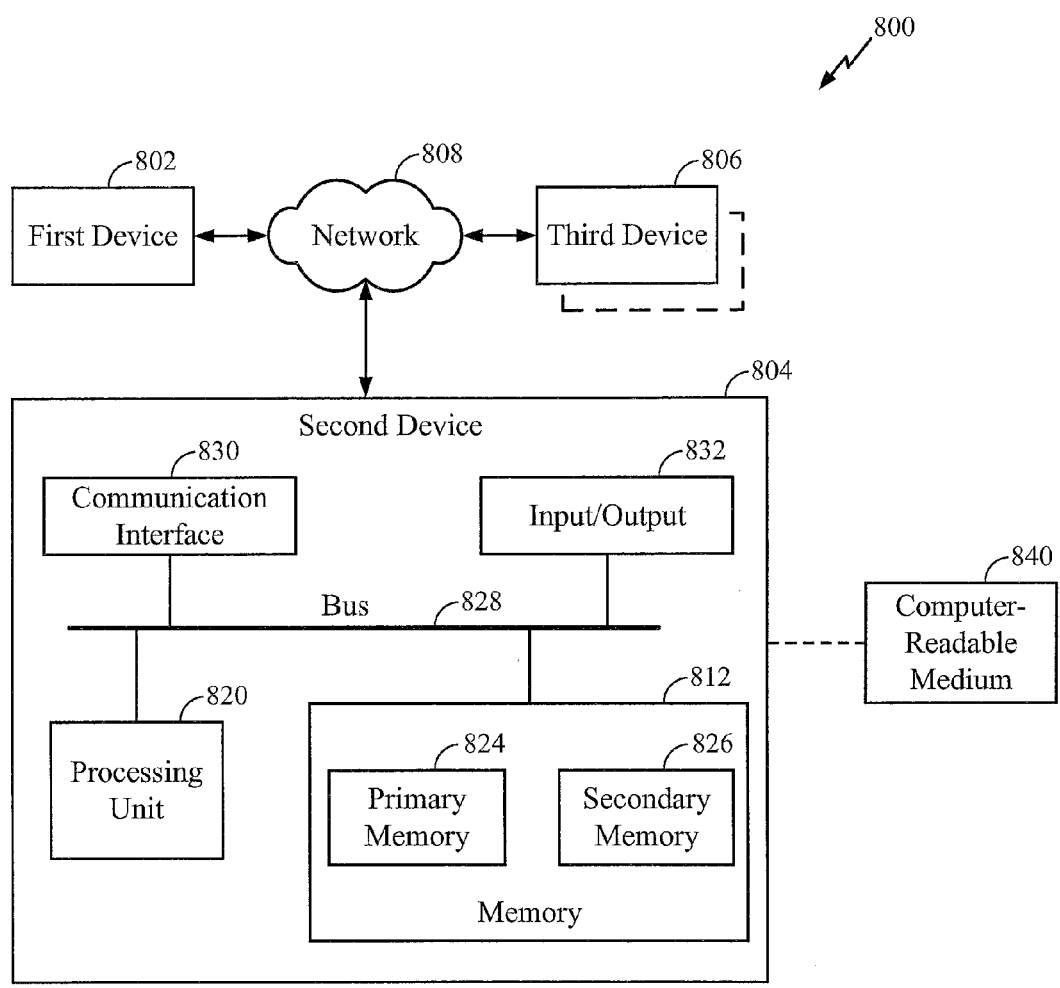
FIG. 8 is a schematic diagram of a network computing environment according to an implementation.

SPS receiver 212 may include any type of receiver capable of receiving SPS signals from positioning satellites and processing the signals to provide one or more position estimates for a mobile device. SPS receiver 212 may be configured to operate with any existing or future SPS system including, for example, the Global Positioning System (GPS), the GLONASS system, the Compass system, the Galileo system, the IRNSS system, the GNSS system and other systems that use Satellite Based Augmentation Systems (SBASs) and/or Ground Based Augmentations Systems (GBASs), and/or other satellite navigation systems. In some implementations, one or more of the processes or techniques described herein may be implemented, either partially or fully, within SPS receiver 212 or a similar structure. It should be appreciated that the mobile device architecture 200 of FIG. 1 represents one possible example of an architecture that may be used in a implementation. Other architectures may alternatively be used. It should also be appreciated that all or part of the various devices, processes, or methods described herein may be implemented using any combination of hardware, firmware, and/or software. FIG. 8 is a schematic diagram illustrating an example computing and communications environment 800 that may include one or more devices configurable to implement techniques or processes described above, for example, in connection with example techniques for computing, updating or applying a clock model. System 800 may include, for example, a first device 802, a second device 804, and a third device 806, which may be operatively coupled together through a network 808.

First device 802, second device 804 and third device 806, as shown in FIG. 8, may be representative of any device, appliance or machine that may be configurable to exchange data over wireless communications network 808. By way of example but not limitation, any of first device 802, second device 804, or third device 806 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 802, 804, or 806, respectively, may comprise one or more of an almanac server, an access point, or a mobile station in accordance with the examples described herein.

Similarly, network 808, as shown in FIG. 8, is representative of one or more communication links, processes, or resources configurable to support the exchange of data between at least two of first device 802, second device 804, and third device 806. By way of example but not limitation, network 808 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 806, there may be additional like devices operatively coupled to network 808.

It is recognized that all or part of the various devices and networks shown in system 800, and the processes and methods as further described herein, may be implemented using or otherwise including hardware, firmware, software, or any combination thereof.

Thus, by way of example but not limitation, second device 804 may include at least one processing unit 820 that is operatively coupled to a memory 812 through a bus 828.

Processing unit 820 is representative of one or more circuits configurable to perform at least a portion of a data computing procedure or process. By way of example but not limitation, processing unit 820 may include one or more processors, controllers, microprocessors, microcontrollers, application specific integrated circuits, digital signal processors, programmable logic devices, field programmable gate arrays, and the like, or any combination thereof.

Memory 822 is representative of any data storage mechanism. Memory 822 may include, for example, a primary memory 824 or a secondary memory 826. Primary memory 824 may include, for example, a random access memory, read only memory, etc. While illustrated in this example as being separate from processing unit 820, it should be understood that all or part of primary memory 824 may be provided within or otherwise co-located/coupled with processing unit 820.

Secondary memory 826 may include, for example, the same or similar type of memory as primary memory or one or more data storage devices or systems, such as, for example, a disk drive, an optical disc drive, a tape drive, a solid state memory drive, etc. In certain implementations, secondary memory 826 may be operatively receptive of, or otherwise configurable to couple to, a computer-readable medium 840. Computer-readable medium 840 may include, for example, any medium that can carry or make accessible data, code or instructions for one or more of the devices in system 800. Computer readable medium 840 may also be referred to as a storage medium.

Second device 804 may include, for example, a communication interface 830 that provides for or otherwise supports the operative coupling of second device 804 to at least network 808. By way of example but not limitation, communication interface 830 may include a network interface device or card, a modem, a router, a switch, a transceiver, and the like.

Second device 804 may include, for example, an input/output 832. Input/output 832 is representative of one or more devices or features that may be configurable to accept or otherwise introduce human or machine inputs, or one or more devices or features that may be configurable to deliver or otherwise provide for human or machine outputs. By way of example but not limitation, input/output device 832 may include an operatively configured display, speaker, keyboard, mouse, trackball, touch screen, data port, etc.

Another position location system that may be used by wireless devices is Enhanced Observed Time Difference ("E-OTD"). E-OTD is a position location system that is optimized for use in Global System for Mobile communications ("GSM") and General Packet Radio Service ("GPRS") wireless communication systems. In this system, the mobile device monitors transmission bursts from multiple base stations and measures the time shifts between the arrival of frames in order to determine its position. A mobile device may receive signals from three or more base stations to estimate its position. However, the E-OTD system requires the use of Location Measurement Units ("LMUs") strategically placed throughout the network in order to provide the system with the precise timing enabling accurate position estimation.

Another position location system that may be used by wireless phones is Observed Time Difference of Arrival ("OTDOA"). OTDOA is a position location system that is optimized for use in Wideband Code Division Multiple Access ("WCDMA") systems. The OTDOA position location system operates similar to the E-OTD system. A position of a mobile device may be estimated by measuring a time difference of arrival of communication signals from multiple base stations.

As used herein, the term "mobile device" refers to a device that may from time to time have a position that changes. Such changes in position may comprise changes to direction, distance, and/or orientation. In particular examples, a mobile device may comprise a cellular telephone, wireless communication device, user equipment, laptop computer, other personal communication system ("PCS") device, personal digital assistant ("PDA"), personal audio device ("PAD"), portable navigational device, or other portable communication devices. A mobile device may also comprise a processor or computing platform adapted to perform functions controlled by machine-readable instructions.

The term "acquire" as used herein as it relates to wireless signals received at a mobile device refers to a mobile device obtaining sufficient signal attributes or symbols from a wireless signal to enable processing of the received wireless signal to obtain at least some information therein. Example types of information that may be obtained by a mobile device in acquiring a wireless signal may include, but are not limited to, carrier frequency, radio-frequency (RF) phase, code, code-phase, timing, messages, transmitter identifier, or Doppler shift, to list but a few examples. Further, it should be noted that the scope of claimed subject matter is not limited to any particular technique for acquiring a wireless signal.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

The invention claimed is:

1. A method comprising, at a mobile device:
receiving from a wireless communication network parameters of a clock model determined by a server based, at least in part, on one or more fine time measurements received from one or more other mobile devices,
    wherein the one or more fine time measurements are based, at least in part, on signals received from an asynchronous communication network at said one or more other mobile devices and a time reference in signals received from a synchronous network at said one or more other mobile devices, and
    wherein the parameters of the clock model include a first frame number and a first time for the first frame number, wherein the first time is a first observable time reference that is synchronized to a known clock, and wherein the first frame number is based, at least in part, on the one or more fine time measurements;
observing signals transmitted by one or more transmitters in the asynchronous communication network;
calculating an estimate of a second time based, at least in part, on the first frame number and an observed signal frame number in at least one of the observed signals of the asynchronous network, wherein the second time is a second observable time reference that is synchronized to the known clock; and
applying the estimate of the second time to obtain a position fix at the mobile device.

2. The method of claim 1, wherein said parameters of the clock model further comprise a time offset applied to said first frame number.

3. The method of claim 2, wherein said time offset is applied according to a satellite positioning system (SPS) time.

4. The method of claim 2, wherein said parameters comprise a frequency offset descriptive of a clock to advance time in said asynchronous communication network.

5. The method of claim 1, wherein said asynchronous communication network comprises a GSM network, WCDMA network or LIE network.

6. The method of claim 1 wherein the first time and the second time comprise GNSS times.

7. An article comprising:
a non-transitory storage medium comprising machine-readable instructions stored thereon which are executable by a processor in a mobile device to:
receive from a wireless communication network parameters of a clock model determined by a server based, at least in part, on one or more fine time measurements received from one or more other mobile devices,
   wherein the one or more fine time measurements are based, at least in part, on signals received from an asynchronous communication network at said one or more other mobile devices and a time reference in signals received from a synchronous network at said one or more other mobile devices, and
   wherein the parameters of the clock model include a first frame number and a first time for the first frame number, wherein the first time is a first observable time reference that is synchronized to a known clock, and wherein the first frame number is based, at least in part, on the one or more fine time measurements;
observe signals transmitted by one or more transmitters in the asynchronous communication network;
calculate an estimate of a second time based, at least in part, on the first frame number and an observed signal frame number in at least one of the observed signals of the asynchronous network, wherein the second time is a second observable time reference that is synchronized to the known clock; and
apply the estimate of the second time to obtain a position fix at the mobile device.

8. A mobile device comprising:
a receiver to acquire signals transmitted in an asynchronous communication network; and
a processor to:
receive from a wireless communication network parameters of a clock model determined by a server based, at least in part, on one or more fine time measurements received from one or more other mobile devices,
   wherein the one or more fine time measurements are based, at least in part, on signals received from the asynchronous communication network at said one or more other mobile devices and a time reference in signals received from a synchronous network at said one or more other mobile devices, and
   wherein the parameters of the clock model include a first frame number and a first time for the first frame number, wherein the first time is a first observable time reference that is synchronized to a known clock, and wherein the first frame number is based, at least in part, on the one or more fine time measurements;
observe signals acquired at said receiver and transmitted by one or more transmitters in the asynchronous communication network;
calculate an estimate of a second time based, at least in part, on the first frame number and an observed signal frame number in at least one of the observed signals of the asynchronous network, wherein the second time is a second observable time reference that is synchronized to the known clock; and
apply the estimate of the second time to obtain a position fix at the mobile device.

9. The mobile device of claim 8, wherein said parameters of the clock model further comprise a time offset applied to said first frame number.

10. The mobile device of claim 9, wherein said time offset is applied according to a satellite positioning system (SPS) time.

11. The mobile device of claim 9, wherein said parameters comprise a frequency offset descriptive of a clock to advance time in said asynchronous communication network.

12. The mobile device of claim 8, wherein said asynchronous communication network comprises a GSM network or WCDMA network.

13. A mobile device comprising:
means for receiving from a wireless communication network parameters of a clock model determined by a server based, at least in part, on one or more fine time measurements received from one or more other mobile devices,
   wherein the one or more fine time measurements are based, at least in part, on signals received from an asynchronous communication network at said one or more other mobile devices and a time reference in signals received from a synchronous network at said one or more other mobile devices, and
   wherein the parameters of the clock model include a first frame number and a first time for the first frame number, wherein the first time is a first observable time reference that is synchronized to a known clock, and wherein the first frame number is based, at least in part, on the one or more fine time measurements;
means for observing signals transmitted by one or more transmitters in the asynchronous communication network;
means for calculating an estimate of a second time based, at least in part, on the first frame number and an observed signal frame number in at least one of the observed signals of the asynchronous network, wherein the second time is a second observable time reference that is synchronized to the known clock; and
means for applying the estimate of the second time to obtain a position fix at the mobile device.

* * * * *